(12) United States Patent
Bourdev et al.

(10) Patent No.: US 11,256,984 B2
(45) Date of Patent: Feb. 22, 2022

(54) DATA COMPRESSION FOR MACHINE LEARNING TASKS

(71) Applicant: WaveOne Inc., Mountain View, CA (US)

(72) Inventors: Lubomir Bourdev, Mountain View, CA (US); Carissa Lew, San Jose, CA (US); Sanjay Nair, Fremont, CA (US); Oren Rippel, Mountain View, CA (US)

(73) Assignee: WaveOne Inc., Mountain View, CA (US)

(*) Notice: Subject to any disclaimer, the term of this patent is extended or adjusted under 35 U.S.C. 154(b) by 1074 days.

(21) Appl. No.: 15/844,447

(22) Filed: Dec. 15, 2017

(65) Prior Publication Data

US 2018/0174047 A1    Jun. 21, 2018

Related U.S. Application Data

(60) Provisional application No. 62/458,749, filed on Feb. 14, 2017, provisional application No. 62/434,602, (Continued)

(51) Int. Cl.
*G06N 3/08* (2006.01)
*G06N 3/04* (2006.01)
(Continued)

(52) U.S. Cl.
CPC ............... *G06N 3/08* (2013.01); *G06N 3/04* (2013.01); *G06N 20/00* (2019.01);
(Continued)

(58) Field of Classification Search
CPC combination set(s) only.
See application file for complete search history.

(56) References Cited

U.S. PATENT DOCUMENTS 6,091,773 A * 7/2000 Sydorenko .............. G06T 9/002
                                                      375/240.03
10,192,327 B1 * 1/2019 Toderici ............... G06K 9/6256
(Continued)

OTHER PUBLICATIONS

Dony et al., "Neural Network Approaches to Image Compression", Feb. 1995, Proceedings of the IEEE, vol. 83, No. 2, pp. 288-303 (Year: 1995).*

(Continued)

*Primary Examiner* — Kamran Afshar
*Assistant Examiner* — Benjamin J Buss
(74) *Attorney, Agent, or Firm* — Fenwick & West LLP

(57) ABSTRACT

A machine learning (ML) task system trains a neural network model that learns a compressed representation of acquired data and performs a ML task using the compressed representation. The neural network model is trained to generate a compressed representation that balances the objectives of achieving a target codelength and achieving a high accuracy of the output of the performed ML task. During deployment, an encoder portion and a task portion of the neural network model are separately deployed. A first system acquires data, applies the encoder portion to generate a compressed representation, performs an encoding process to generate compressed codes, and transmits the compressed codes. A second system regenerates the compressed representation from the compressed codes and applies the task model to determine the output of a ML task.

40 Claims, 7 Drawing Sheets

Related U.S. Application Data filed on Dec. 15, 2016, provisional application No. 62/434,600, filed on Dec. 15, 2016, provisional application No. 62/434,603, filed on Dec. 15, 2016.

(51) Int. Cl.

| | |
|---|---|
| *G06N 20/00* | (2019.01) |
| *G06K 9/00* | (2006.01) |
| *G06K 9/62* | (2006.01) |
| *G06K 9/46* | (2006.01) |
| *H04N 19/126* | (2014.01) |
| *H04N 19/167* | (2014.01) |
| *H04N 19/172* | (2014.01) |
| *H04N 19/196* | (2014.01) |
| *H04N 19/91* | (2014.01) |
| *H04N 19/44* | (2014.01) |
| *G06K 9/66* | (2006.01) |
| *G06T 5/00* | (2006.01) |
| *H04N 19/13* | (2014.01) |
| *H04N 19/149* | (2014.01) |
| *H04N 19/18* | (2014.01) |
| *H04N 19/48* | (2014.01) |
| *H04N 19/154* | (2014.01) |
| *H04N 19/33* | (2014.01) |

(52) U.S. Cl.
CPC ..... *G06K 9/00288* (2013.01); *G06K 9/00744* (2013.01); *G06K 9/00771* (2013.01); *G06K 9/4619* (2013.01); *G06K 9/4628* (2013.01); *G06K 9/6212* (2013.01); *G06K 9/6232* (2013.01); *G06K 9/6256* (2013.01); *G06K 9/6263* (2013.01); *G06K 9/6274* (2013.01); *G06K 9/66* (2013.01); *G06K 2209/01* (2013.01); *G06N 3/0454* (2013.01); *G06N 3/084* (2013.01); *G06T 5/002* (2013.01); *H04N 19/126* (2014.11); *H04N 19/13* (2014.11); *H04N 19/149* (2014.11); *H04N 19/154* (2014.11); *H04N 19/167* (2014.11); *H04N 19/172* (2014.11); *H04N 19/18* (2014.11); *H04N 19/197* (2014.11); *H04N 19/33* (2014.11); *H04N 19/44* (2014.11); *H04N 19/48* (2014.11); *H04N 19/91* (2014.11)

(56) References Cited

U.S. PATENT DOCUMENTS

| | | | | |
|---|---|---|---|---|
| 10,623,775 | B1* | 4/2020 | Theis | H04N 19/124 |
| 2017/0230675 | A1* | 8/2017 | Wierstra | G06N 3/08 |
| 2018/0063538 | A1* | 3/2018 | Bernal | H04N 19/103 |
| 2018/0107926 | A1* | 4/2018 | Choi | G06N 3/063 |
| 2019/0171936 | A1 | 6/2019 | Karras et al. | |

OTHER PUBLICATIONS

Gong et al., "Compressing Deep Convolutional Networks Using Vector Quantization", Dec. 18, 2014 (Year: 2014).*
Omaima N.A. AL-Allaf, "Improving the Performance of Backpropagation Neural Network Algorithm for Image Compression/Decompression System", 2010, Journal of Computer Science, pp. 1347-1354 (Year: 2010).*
Antonini, M. et al., "Image Coding Using Wavelet Transform," IEEE Transactions on Image Processing, Apr. 1992, pp. 205-220, vol. 1, No. 2.
Balle, J. et al., "End-to-End Optimized Image Compression," ICLR 2017, Mar. 3, 2017, pp. 1-27.
Balle, J. et al., "Variational Image Compression with a Scale Hyperprior," ICLR 2018, May 1, 2018, pp. 1-23.
Bottou, L. et al., "High Quality Document Image Compression with "DjVu"," Journal of Electronic Imaging, Jul. 1998, pp. 410-4258, vol. 7, No. 3.
Dang-Nguyen, D.-T. et al., "RAISE: A Raw Images Dataset for Digital Image Forensics," In Proceedings of the 6th ACM Multimedia Systems Conference, ACM, 2015, MMSys'15, Mar. 18-20, 2015, pp. 219-224.
Denton, E. L. et al., "Deep Generative Image Models Using a Laplacian Pyramid of Adversarial Networks," In Advances in Neural Information Processing Systems, Jun. 18, 2015, pp. 1486-1494.
Goodfellow, I. et al., "Generative Adversarial Nets." In Advances in Neural Information Processing Systems, 2014, pp. 2672-2680.
Haffner, P. et al., "DjVu: Analyzing and Compressing Scanned Documents for Internet Distribution," ICDAR 1999, 1999, pp. 1-4.
Hinton, G.E. et al., "Reducing the Dimensionality of Data with Neural Networks," Science, Jul. 28, 2006, pp. 504-507, vol. 313.
Isola, P. et al., "Image-to-Image Translation with Conditional Adversarial Networks," Nov. 22, 2017, pp. 1-17.
Kingma, D. et al., "ADAM: A Method for Stochastic Optimization," ICLR 2015, Jan. 30, 2017, pp. 1-15.
Ledig, C. et al., "Photo-Realistic Single Image Super-Resolution Using a Generative Adversarial Network," Nov. 21, 2016, pp. 1-19.
Mallat, S. G. "A Theory for Multiresolution Signal Decomposition: The Wavelet Representation," IEEE Transactions on Pattern Analysis and Machine Intelligence, Jul. 1989, pp. 674-693, vol. 11, No. 7.
Mathieu, M. et al., "Deep Multi-Scale Video Prediction Beyond Mean Square Error," ICLR 2016, Feb. 26, 2016, pp. 1-14.
Radford, A. et al., "Unsupervised Representation Learning with Deep Convolutional Generative Adversarial Networks," ICLR 2016, Jan. 7, 2016, pp. 1-16.
Rippel, O. et al., "Learning Ordered Representations with Nested Dropout," In International Conference on Machine Learning, Feb. 5, 2014, 11 pages.
Salimans, T. et al., "Improved Techniques for Training GANs," 30th Conference on Neural Information Processing Systems (NIPS 2016), Barcelona, Spain, In Advances in Neural Information Processing Systems, 2016, pp. 2226-2234.
Santurkar, S. et al., "Generative Compression," Jun. 4, 2017, pp. 1-10.
SHI,W. et al., "Real-Time Single Image and Video Super-Resolution Using an Efficient Sub-Pixel Convolutional Neural Network," the IEEE Conference on Computer Vision and Pattern Recognition (CVPR), 2016, pp. 1874-1883.
Theis, L. et al., "Lossy Image Compression with Compressive Autoencoders," ICLR 2017, Mar. 1, 2017, pp. 1-19.
Thomee, B. et al., "YFCC100M: The New Data in Multimedia Research," Communications of the ACM, Feb. 2016, pp. 64-73, vol. 59, No. 2.
Toderici, G. et al., "Full Resolution Image Compression with Recurrent Neural Networks," ICLR 2017, Jul. 7, 2017, pp. 1-9.
Toderici, G. et al., "Variable Rate Image Compression with Recurrent Neural Networks," ICLR 2016, pp. 1-12.
Wallace, G.K., "The JPEG Still Picture Compression Standard," IEEE Transactions on Consumer Electronics, Feb. 1992, pp. xviii-xxxiv, vol. 38, No. 1.
Wang, Z. et al., "Image Quality Assessment: from Error Visibility to Structural Similarity," IEEE Transactions on Image Processing, Apr. 2004, pp. 600-612, vol. 13, No. 4.
Wang, Z. et al., "Multiscale Structural Similarity for Image Quality Assessment," In Conference Record of the Thirty-Seventh Asilomar Conference on Signals, Systems and Computers, 2004., IEEE, Nov. 9-12, 2003, pp. 1398-1402, vol. 2.
Wikipedia: Structural Similarity, Wikipedia.org, Last Edited Mar. 22, 2018, 7 pages, [Online] [Retrieved on Apr. 10, 2018] Retrieved from the Internet<URL:https://en.wikipedia.org/wiki/Structural_similarity>.

* cited by examiner

DATA COMPRESSION FOR MACHINE LEARNING TASKS

CROSS REFERENCE TO RELATED APPLICATIONS

This application claims the benefit of Provisional U.S. Application No. 62/434,600, filed Dec. 15, 2016, Provisional U.S. Application No. 62/434,602, filed Dec. 15, 2016, Provisional U.S. Application No. 62/434,603, filed Dec. 15, 2016, and Provisional U.S. Application No. 62/458,749, filed Feb. 14, 2017. Each aforementioned provisional application is incorporated herein by reference in its entirety.

BACKGROUND

Embodiments of the invention generally relate to machine learning tasks, and more specifically to intelligently encoding structures of acquired data that are informative for performing a machine learning task.

Bandwidth availability is often a bottleneck that prevents the delivery of complex data. Limited bandwidth availability precludes the transmission of large datasets, examples of which include data that can be used to perform machine learning tasks. This poses a problem for multi-system environments where the acquiring of data and the machine learning task are performed by separate systems. For example, a first system can be a security camera that captures images and the second system can be a server that performs a facial recognition machine learning algorithm on the captured images. Here, the first system needs to transmit the acquired data to the second system but encounters difficulties due to the bandwidth bottleneck.

One solution is to encode the acquired data as compressed codes for transmission. However, conventional encoders employ hard-coded mechanisms and therefore, poorly compress acquired data that is informative for a particular machine learning task. Conventional encoders struggle to generate compressed codes that 1) can overcome the barrier posed by the bandwidth bottleneck and 2) can be used to accurately determine an output of a machine learning task.

SUMMARY

A machine learning (ML) task system trains a neural network model to discover structures and patterns of acquired data that are encoded as a compressed codes of the acquired data. The compressed codes includes specific information of the acquired data such that the compressed codes can be decoded and used to determine an output of a machine learning task.

In various embodiments, the ML task system does not seek to generate a compressed representation of the acquired data that can be reconstructed as the acquired data, but rather seeks to identify and encode only the information of the acquired data that is needed to perform the ML task. In other words, the ML task system discards information about the acquired data that is less useful for performing the ML task. In some embodiments, the compressed representation of the acquired data generated by the ML task system cannot be decoded or otherwise used to reconstruct the acquired data.

Generally, the ML task system trains neural network models that are specific for a particular type of ML task. Therefore, each neural network model learns an efficient representation of acquired data for the particular ML task. The neural network model includes two portions, hereafter referred to as an encoder portion (e.g., encoder model) and a task portion (e.g., task model). In some embodiments, the neural network model includes more than one encoder portion in addition to a task portion. The encoder and task models are jointly trained so that the encoder model learns an efficient representation of the acquired data that can be accurately interpreted by the task model to determine an output of a ML task. In various embodiments, the encoder and task models are trained to minimize a loss function.

During training, the ML task system trains the neural network model using training examples that each includes acquired data and a ML task output label. The ML task system trains the encoder model to generate the compressed representation of the acquired data that, when encoded as compressed codes, meets a target codelength. The target codelength can be selected according to the limitations of the available bandwidth. The ML task system backpropagates a codelength loss that represents the encoding efficiency of the compressed representation of the acquired data of the training example. Here, the codelength loss is one component of the loss function used to train the encoder and task model.

The ML task system applies the compressed representation as input to the task model. The task model yields the ML task output. As an example, if the ML task is a classification ML task, the task model outputs one or more scores that represent a likelihood that the acquired data falls within a category. The ML task system calculates a task loss that represents the accuracy of the output of the task model. Here, the task loss is a component of the loss function used to train the encoder model and the task model.

During deployment, the encoder model and the task model can be deployed in separate systems. For example, the encoder model can be provided to a first system, such as a security camera. The first system applies the encoder model to generate a compressed representation of acquired data. The first system applies an encoding process to the compressed representation to generate compressed codes and transmits the compressed codes that satisfies the constraints of the bandwidth availability. The second system receives the compressed codes, decodes the compressed codes to generate the compressed representation, and applies the task model to determine an accurate ML task output. Altogether, the deployment of the encoder model and the task model address the barrier of the bandwidth bottleneck without sacrificing the accuracy of a predicted ML task output.

Figure 1A:
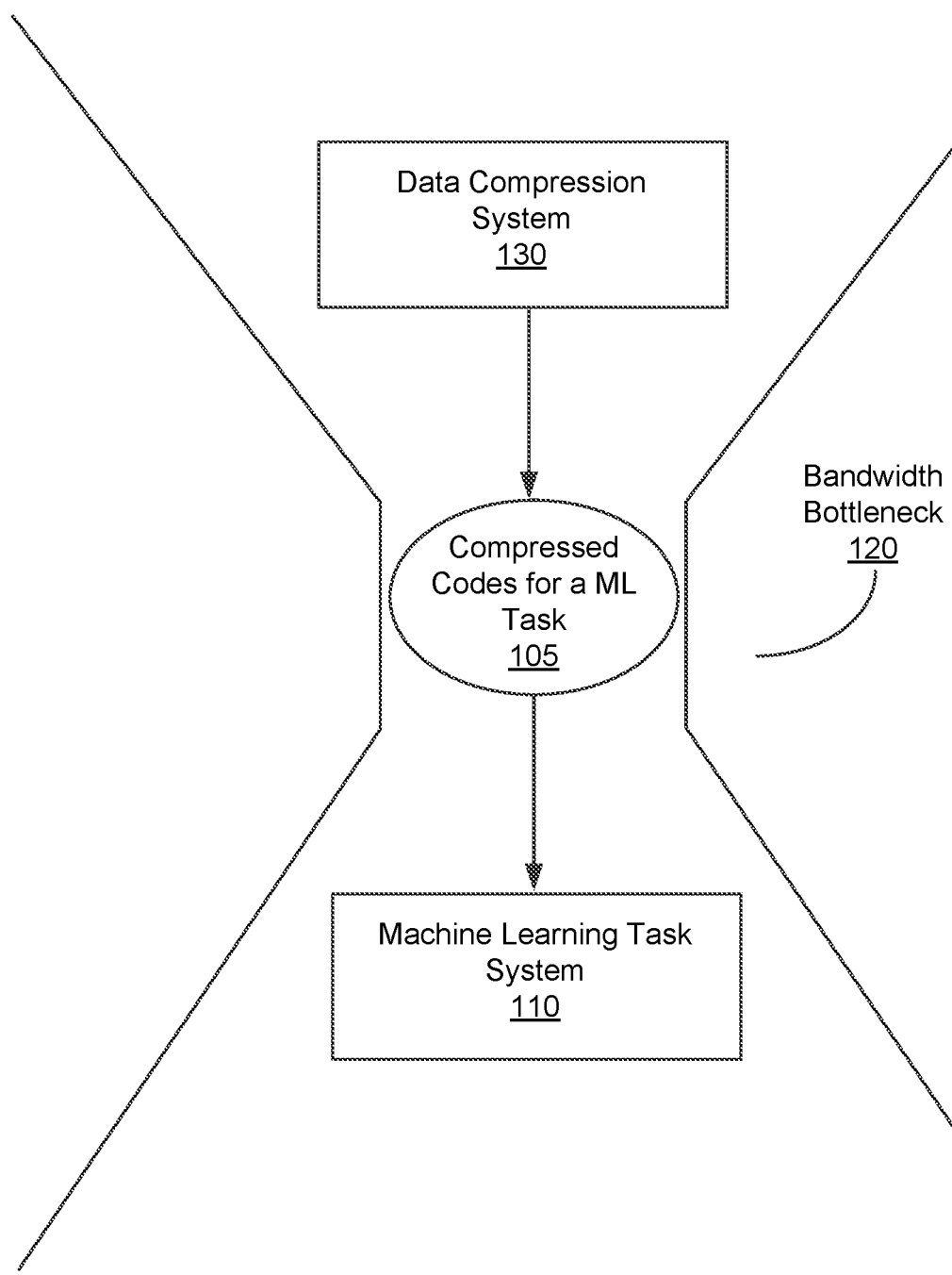
FIG. 1A depicts the transmission of compressed codes of acquired data for a machine learning task, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "140A," indicates that the text refers specifically to the element having that particular reference numeral. A reference numeral in the text without a following letter, such as "140," refers to any or all of the elements in the figures bearing that reference numeral (e.g. "encoder model 140" in the text refers to reference numerals "encoder model 140A" and/or "encoder model 140B" in the figures).

DETAILED DESCRIPTION

System Environment

FIG. 1A depicts the transmission of compressed codes 105 of acquired data for a machine learning task, in accordance with an embodiment. A data compression system 130 generates and transmits compressed codes 105 of acquired data that satisfies the constraints of the bandwidth bottleneck 120. For example, the compressed codes 105 may have a target codelength that can be transmitted through the bandwidth bottleneck 120 over a predetermined amount of time.

Generally, the data compression system 130 encodes information of acquired data that is informative for performing a ML task. Less important information of the acquired data (e.g., information not needed for performing the ML task) can be discarded. Thus, the size (e.g., number of bits) of the compressed codes 105 can be reduced to meet the constraints of the bandwidth bottleneck 120. In various embodiments, the compressed codes is encoded from a representation that is learned for the particular ML task. In other words, for each type of ML task, the data compression system 130 generates a compressed codes 105 that includes information describing features that are important for performing that particular ML task. Upon receiving the compressed codes 105, the ML task system 110 uses the compressed codes 105 to perform the ML task. Examples of ML tasks include, but are not limited to classification tasks, regression tasks, clustering tasks, density estimation tasks, dimensionality reduction tasks, and multivariate querying tasks. Examples of classification tasks can be an object detection (e.g., face detection, human detection, car detection, building detection, and the like) and object recognition (e.g., facial recognition, text recognition, number recognition, and the like).

To provide a specific example, assume that the data compression system 130 acquires data in the form of an image that can be used by the ML task system 110 to perform a ML task, such as a facial recognition ML task (e.g., classification task). The data compression system 130 processes the received image to generate the compressed codes. For example, the data compression system 130 identifies the most important features of the image, where the important features of the image are informative for performing the facial recognition ML task. One example of an important feature can include edge objects that correspond to an individual's face within the image. Features of the image that are of lesser importance for performing the facial recognition ML task can be discarded, thereby reducing the size (e.g., number of bits) of the compressed codes 105 of the image.

Figure 1B:
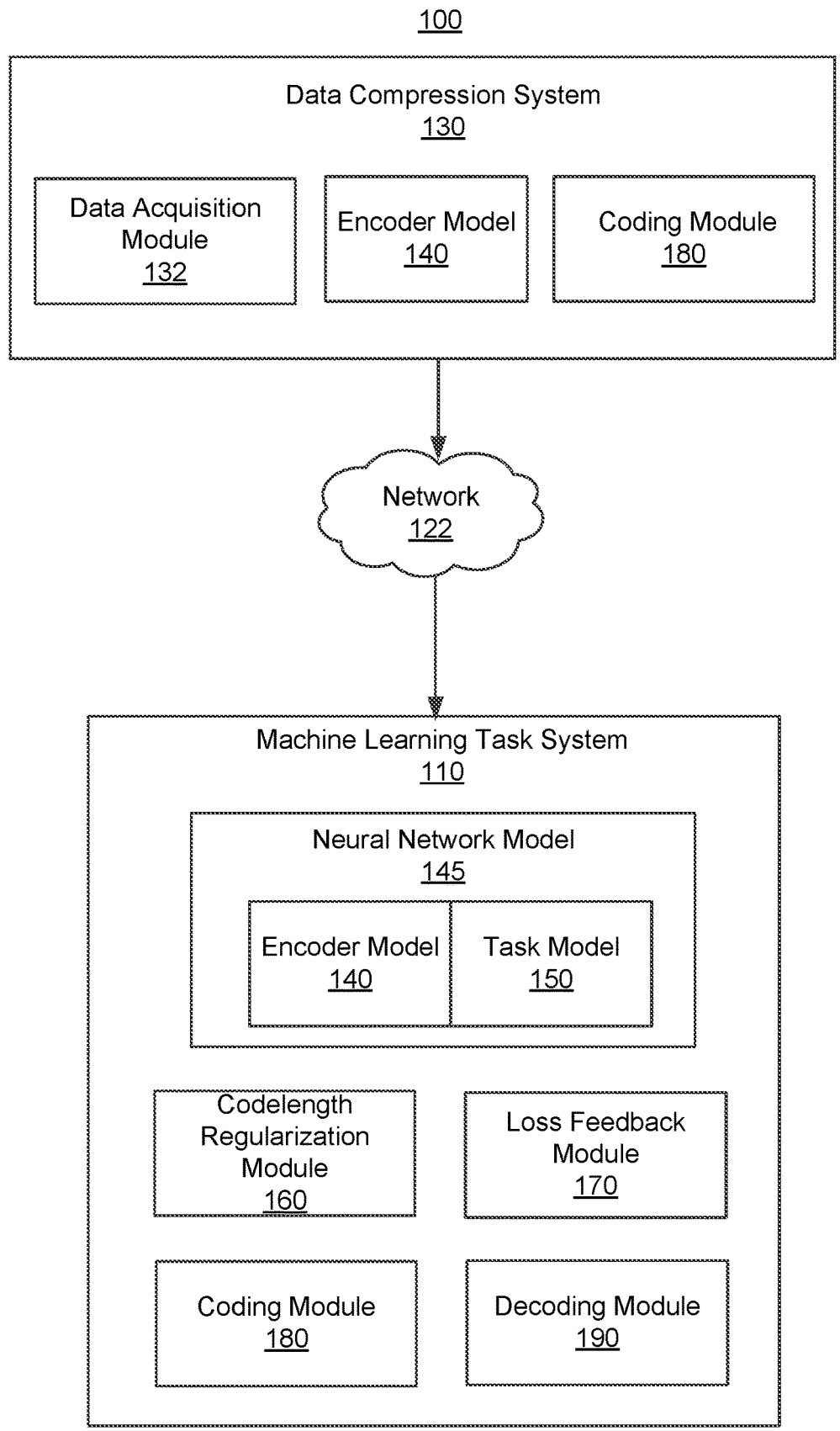
FIG. 1B depicts a block diagram of a system environment including a data compression system and a machine learning task system, in accordance with an embodiment.

FIG. 1B depicts a block diagram architecture of the data compression system 130 and the ML task system 110, in accordance with an embodiment. The ML task system 110 includes a neural network model 145, a codelength regularization module 160, a loss feedback module 170, an coding module 180, and an decoding module 190. The data compression system 130 includes a data acquisition module 132, an coding module 180, and the encoder portion (e.g., encoder model 140) of the neural network model 145. In various embodiments, the data compression system 130 receives the coding module 180 and the encoder model 140 from the machine learning task system 110.

Referring to the structure of the neural network model 145, it includes an input layer of nodes, one or more intermediate layers, and an output layer. As shown in FIG. 1B, the neural network model 145 is composed of an encoder portion (e.g., encoder model 140) and a task portion (e.g., task model 150). The encoder model 140 can be a first set of layers including the input layer of the neural network model 145 and the task model 150 can be a second set of layers including the output layer of the neural network model 145. Here, the output layer of the encoder model 140 represents an intermediate layer of the neural network model 145.

Each of the encoder model 140 and the task model 150 are composed of an input layer, one or more intermediate layers, and an output layer. Each layer of the encoder model 140 and the task model 150 includes learned parameters, such as learned weights and learned biases, that are adjusted during training. In various embodiments, the encoder model 140 and the task model 150 are connected. For example, the output layer of the encoder model 140 can serve as the input layer of the task model 150.

The processes performed by the modules of the data compression system 130 and the ML task system 110 are hereafter described in reference to a training phase and a deployment phase. The training phase refers to the training of one or more machine learning models that are then applied during the deployment phase. For example, during the training phase, the encoder model 140 is trained to identify informative features of acquired data to generate a compressed representation. During deployment, the encoder model 140 is applied to generate a compressed representation of acquired data that can be further encoded to generate compressed codes 105.

In various embodiments, the system architecture of the data compression system 130 and the ML task system 110 can be differently designed. For example, the modules employed during the training phase (e.g., neural network model 145, codelength regularization module 160, loss feedback module 170, and coding module 180) can be employed by a third party system that performs the training of the neural network model 145. Thus, the third party system can provide the encoder model 140 to the data compression system 130 and the task model 150 to the ML task system 110. During deployment, the data compression system 130 generates a compressed representation by the applying the received encoder model 140. The ML task system 110 predicts the ML task output using the compressed representation by applying the task model 150.

Data Compression System

The data compression system 130 is a system capable of acquiring data that is informative for performing a ML task and encoding the acquired data as a compressed representation. In various embodiments, the data compression system 130 is a device having computer functionality such as a desktop, laptop computer, personal digital assistant (PDA), mobile telephone, smartphone, tablet. In some embodiments, the data compression system 130 is an image or video capturing device such as a camera, video recorder, or another suitable device. While FIG. 1B depicts a single data compression system 130 in the system environment 100, in various embodiments, more than one data compression system 130 may communicate with the ML task system 110 through the network 122. Such an embodiment is described in further detail below in relation to FIG. 4.

The data acquisition module 132 acquires data that are informative for performing a machine learning task. Examples of different types of acquired data can include images, videos, data file, text file, dataset, and the like. For example, if the ML task is a regression task for predicting housing prices, the acquired data for a regression ML task can be a dataset describing numerous characteristics of a house. The acquired data can be used to predict a housing price for the house. As another example, the ML task can be a classification task that identifies the content of an image or video. Here, the acquired data for the classification task can be the image or video. As another example, if the ML task is a clustering ML task, the acquired data can be observed variables such as observed data points stored as a text file or data file. As another example, if the ML task is a multivariate querying task, the acquired data can be multiple datasets or multiple images/videos. Here, the ML task can determine datasets or images/videos that are similar to a target dataset or target image/video. As another example, if the ML task is a density estimation task, the acquired data can be observed variables in a dataset that can be used to predict a likelihood of observing the variables. As another example, if the ML task is a dimensionality reduction task, the acquired data can be a media or data file that can be analyzed to reduce features of the image/data file into a smaller subset.

The encoder model 140 represents the encoder portion of the neural network model 145 trained by the ML task system 110. The encoder model 140 is configured to receive acquired data from the data acquisition module 132. As a specific example, the acquired data may be an image. Here, each pixel of the image can be provided as input to a node in the input layer of the encoder model 140. The encoder model 140 outputs a compressed representation of the acquired data. Deployment of the encoder model 140 by the data compression system 130 is described in further in reference to FIG. 3. The coding module 180 performs a coding process on the compressed representation output by the encoder model 140 to generate compressed codes 105 that can be transmitted through the network 122 to the ML task system 110.

Machine Learning Task System

The machine learning (ML) task system 110 can be a device having computer functionality such as a desktop, laptop computer, personal digital assistant (PDA), mobile telephone, smartphone, tablet, and the like. In some embodiments, the functions performed by the ML task system 110 can be distributed across a cloud server or rack server. In other words, the functions performed by the ML task system 110 can be distributed across multiple electronic devices and/or distributed across multiple geographic locations.

During the training phase, the ML task system 110 trains neural network models 145. In various embodiments, the ML task system 110 trains neural network models 145 that are each specific for a particular ML task. For example, the ML task system 110 trains a first neural network model 145 for a classification ML task and trains a second neural network model 145 for a multivariate querying ML task. Therefore, for a particular ML task, the encoder model 140 of the neural network model 145 learns a compressed representation that includes features that are important for that ML task. The task model 150 of the neural network model 145 can perform the ML task using the features of the compressed representation. Training of neural network model 145 is described in further detail in reference to FIG. 2.

During the deployment phase, the ML task system 110 receives the compressed codes 105 provided by the data compression system 130 and decodes the compressed codes 105 to regenerate the compressed representation. The compressed representation is applied as input to the task model 150. The task model 150 determines a predicted ML task output given the compressed representation. Deployment of the task model 150 is described in further detail in reference to FIG. 3.

Training the Neural Network Model

Figure 2:
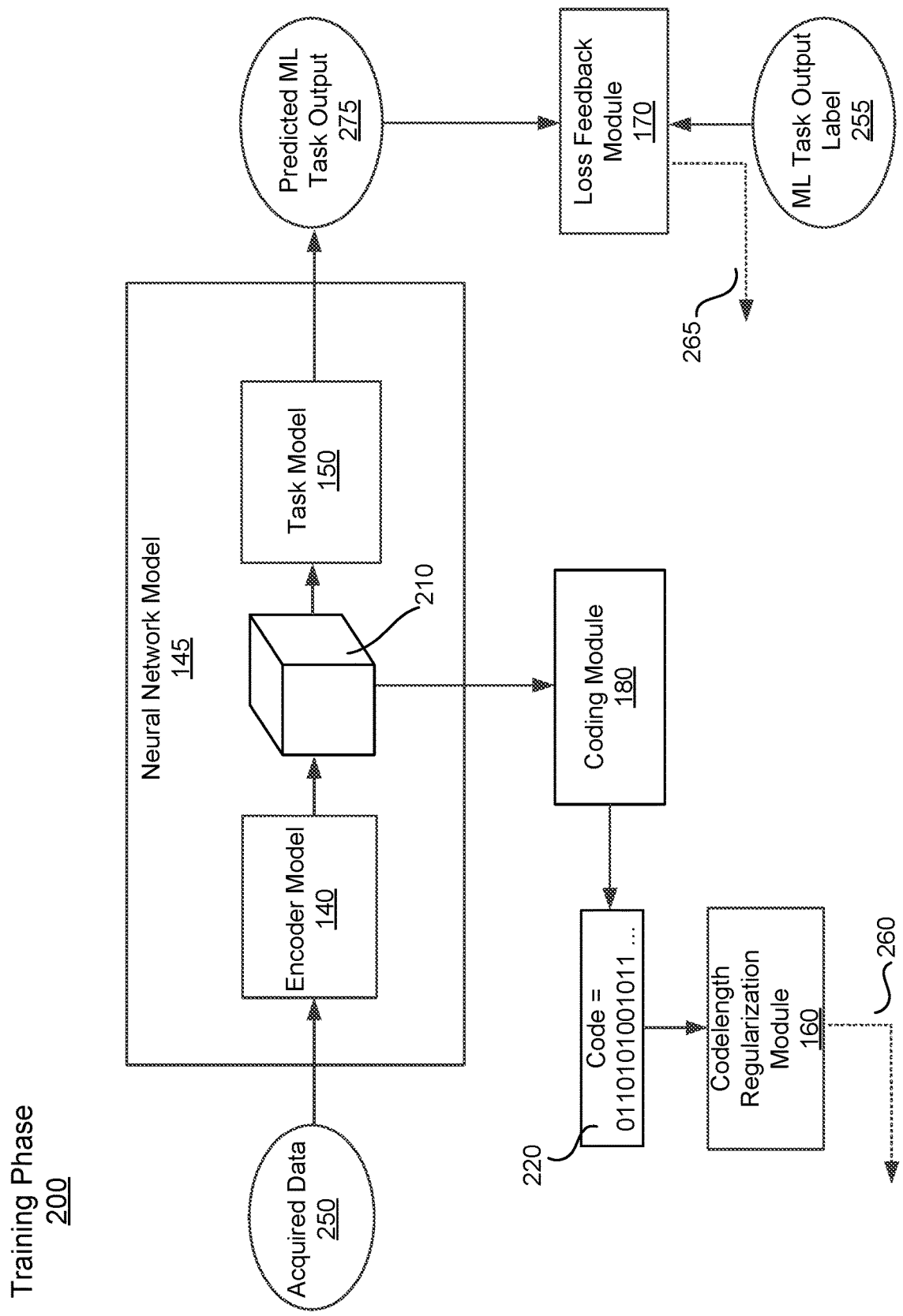
FIG. 2 is a flow diagram of the architecture used to train the neural network model during the training phase, in accordance with an embodiment.

FIG. 2 is a flow diagram of the architecture used to train the neural network model 145 during the training phase 200, in accordance with an embodiment. As shown in FIG. 2, the forward flow of information between modules is depicted as solid arrows whereas the backpropagated feedback is depicted as dotted arrows.

The ML task system 110 trains the neural network model 145 using training examples. Each training example includes acquired data 250 and a corresponding ML task output label 255 that indicates a result of the ML task. The acquired data 250 can be one of an image, video, data file, text file, dataset, and the like. For each training example, the learned parameters, such as the learned weights and learned biases, of the neural network model 145 is trained using a loss function that includes at least two components. A first loss, hereafter referred to as a task loss, refers to the accuracy of the predicted ML task output 275 output by the task model 150 in comparison to the ML task output label 255 of the training example. A second loss, hereafter referred to as a codelength loss, refers to an encoding efficiency of the acquired data 250 that is obtained at an intermediate layer of the neural network model 145. The intermediate layer of the neural network model 145 can be the output layer of the encoder model 140. Therefore, the neural network model 145 is trained to tradeoff between the two losses such that the encoder model 140 can generate a compressed representation that can be encoded with a codelength that meets the bandwidth bottleneck 120 and can also be decoded by the task model 150 to accurately predict the ML task.

In one embodiment, by using the two losses of the loss function, the neural network model 145 is trained to maximize the accuracy of the predicted ML task output 275 while ensuring that the compressed representation is encoded with a codelength that does not exceed a threshold code length. Here, the threshold code length is set according to the bandwidth limitations. In another embodiment, by using the two losses of the loss function, the neural network model 145 is trained to minimize codelength of compressed codes generated from the compressed representation, while maintaining the accuracy of the predicted ML task output 275 at a minimum accuracy threshold.

Encoding Process

Referring to the flow process shown in FIG. 2, the encoder model 140 receives acquired data 250 of a training example. Acquired data 250 can be one of an image, video, data file, text file, dataset, and the like. In various embodiments, the encoder model 140 performs a feature extraction process that identifies features of the acquired data 250 that are informative for the ML task. The encoder model 140 generates a compressed representation 210 of the acquired data 250. Generally, the compressed representation 210 represents the acquired data 250 with respect to the structural features of the acquired data 250.

In one embodiment, as shown in FIG. 2, the compressed representation 210 is a tensor with dimensions of width W, height H, and depth C. For example, if the acquired data 250 is an image, the dimensions of the compressed representation 210 can be the dimensions of the image (e.g., W=width, H=height, C=channels). Specifically, each W×H feature map of the tensor at a particular channel depth c may be associated with the presence of a corresponding structural feature in the acquired data 250. In other embodiments, the compressed representation 210 may be represented by fewer or additional dimensions.

In some embodiments, the encoder model 140 performs additional processing steps on the compressed representation 210. For example, the encoder model 140 can quantize the elements of the compressed representation 210 to categorize the elements into B equal-sized bins. As another example, the encoder model 140 can decompose the quantized elements of the compressed representation 210 into bitplanes such that the compressed representation 210 is a binary tensor. Further description of these steps performed by an encoder model (e.g., feature extraction, quantization, and bitplane decomposition) are described in U.S. application Ser. No. 15/439,893, filed on Feb. 22, 2017, which is hereby incorporated by reference in its entirety.

To generate a codelength loss 260 of the loss function, the compressed representation 210 is provided to the coding module 180 to generate compressed codes 220. In one embodiment, the coding module 180 performs an entropy encoding process to generate the compressed codes 220. In various embodiments, the entropy coding process is an adaptive arithmetic coding process. The adaptive arithmetic coding process is described in further detail in U.S. application Ser. No. 15/439,893, filed on Feb. 22, 2017, which is hereby incorporated by reference in its entirety. Other examples of entropy coding processes include range coding, Huffman encoding, Asymmetric numeral systems, and other methods.

As shown in FIG. 2, the compressed codes 220 is provided to the codelength regularization module 160 to determine a codelength loss 260. The codelength regularization module 160 determines a codelength loss 260 based on the magnitude of the elements of the compressed representation 210. The codelength loss 260 can be repeatedly adjusted such that the length of the compressed codes 220 generated by the coding module 180 achieves a desired target length.

In one embodiment, given a compressed representation 210 with dimensions of C×H×W, the codelength loss 260 is determined by:

$$\mathcal{L}_{cl}(\hat{y}_{i \in S}; \alpha) = \sum_{i \in S} \left[ \frac{\alpha_t}{CHW} \cdot \sum_{chw} \left[ \log_2 |\hat{y}_{i,chw}| + \sum_{(x,y) \in U} \log_2 |\hat{y}_{i,chw} - \hat{y}_{i,(h-y)(w-x)}| \right] \right]$$

where U is the set $\{(0, 1), (1, 0), (1, 1), (-1, 1)\}$, $\alpha_t$ is a weight, and $\hat{y}_{i,chw}$ denotes element chw of the quantized set of tensors generated from training examples. Here, the weight $\alpha_t$ of the codelength loss 260 can be adjusted according to the length of the compressed codes 220 generated by the coding module 180. Specifically, the weight $\alpha_t$ is increased if the length of the compressed codes 220 is above a target length. Conversely, the weight $\alpha_t$ is decreased if the length is below a target length. The target length can be set based on an available bandwidth amount. In this manner, parameters of the encoder model 140 are trained to generate a compressed representation 210 that exploit relatively simple structures of the acquired data 250 when possible.

Task Prediction Process

Returning to the neural network model 145 in FIG. 2, the task model 150 receives the compressed representation 210 as input. Here, the task model 150 synthesizes the features of the compressed representation 210 and performs a ML task on the synthesized features. The task model 150 outputs the predicted ML task output 275. In various embodiments, the task model 150 can perform additional processing steps that reverse processing steps performed by the encoder model 140. For example, the task model 150 perform a bitplane composition step.

The predicted ML task output 275 generated by the task model 150 can be different for each type of ML task. In one embodiment, the ML task is a regression task and therefore, the predicted ML task output 275 can be a predicted value of the regression task. For example, the predicted value can be a predicted housing price or stock price. In one embodiment, the ML task is a classification task and therefore, the predicted ML task output 275 can be one or more scores assigned to classification categories. In one embodiment, the ML task is a clustering task and the ML task output 275 is a clustering of observed variables. In one embodiment, the ML task is a multivariate querying task and the ML task output 275 is a similarity readout. A similarity readout can be a score representing the similarity between two items such as a target image and another image. In one embodiment, the ML task is a density estimation task and the ML task output 275 is a predicted probability determined from a prior density distribution. In one embodiment, the ML task is a dimensionality reduction task and the ML task output 275 is a reduced subset of features.

ML Task Loss Process

The loss feedback module 170 calculates the task loss 265 by comparing the predicted ML task output 275 and a ML task output label 255 of the training example. As stated above, the task loss 265 represents one component of the loss function that is used to train the encoder model 140 and decoder model 150. Examples of loss functions that can be employed by the loss feedback module 170 to calculate the task loss 265 can include a square loss function, hinge loss function, logistic loss function, and cross entropy loss function.

The loss feedback module 170 backpropagates the task loss 265 to train the task model 150 such that the task model 150 can better predict a ML task output 275 that results in a smaller task loss. In various embodiments, the loss feedback module 170 backpropagates the task loss to train the encoder model 140. Thus, the encoder model 140 can better represent important structures of the acquired data 250 in the compressed representation 210. In some embodiments, the loss feedback module 170 backpropagates the task loss to jointly train both the encoder model 140 and the task model 150. Here, a subset of the parameters of the encoder model 140 and a subset of the parameters of the task model 150 can be tied to each other.

Encoding and Predicting a ML Task During Deployment

Figure 3:
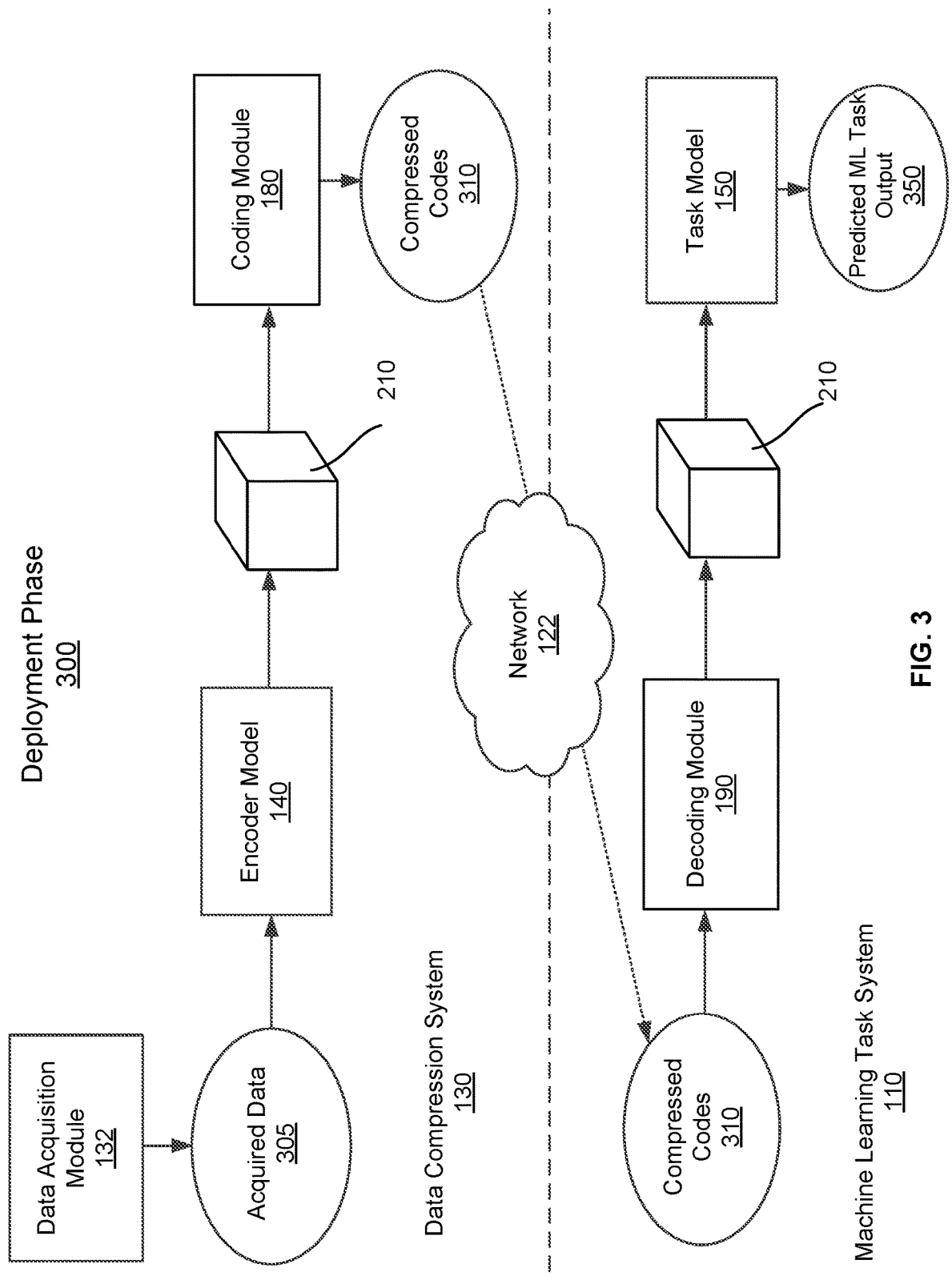
FIG. 3 is an overall flow diagram for predicting a ML task output during the deployment phase, in accordance with an embodiment.

FIG. 3 is an overall flow diagram for predicting a ML task output 350 during the deployment phase 300, in accordance with an embodiment. The data acquisition module 132 of the data compression system 130 acquires data 305 that can be used to perform a ML task.

The acquired data 305 is applied as input to the encoder model 140 which generates the compressed representation 210 of the acquired data 305. The compressed representation 210 is shown as a tensor in FIG. 3, though it can be embodied as a different structure in various embodiments.

In one embodiment, during deployment, the data compression system 130 retrieves an appropriately trained encoder model 140 based on the bandwidth availability between the data compression system 130 and the ML task system 110. For example, when the available bandwidth between the two systems is limited, the data compression system 130 retrieves an encoder model 140 that was trained to generate a compressed representation that is encoded as compressed codes with a target codelength that satisfies the constraints of the limited bandwidth. Conversely, when the bandwidth bottleneck is not a concern, the data compression system 130 retrieves an encoder model 140 that was trained to generate a compressed representation that is encoded as compressed codes with a larger target codelength.

The compressed representation 210 is provided to the coding module 180. The coding module 180 can perform an entropy coding process, such as an adaptive arithmetic coding process, to generate the compressed codes 310 of the acquired data 305. The data compression system 130 transmits the compressed codes 310 through the network 122 to the ML task system 110. Here, if a bandwidth bottleneck 120 exists, the compressed codes 310 can be more efficiently transferred through in comparison to transferring the acquired data 305 itself.

The ML task system 110 receives the compressed codes 310 from the data compression system 130. Here, the decoding module 190 performs an entropy decoding process, such as an adaptive arithmetic decoding process. Generally, the decoding module 190 performs a decoding process that is the inverse process performed by the coding module 180. The decoding module 190 regenerates the compressed representation 210, which is provided as input to the task model 150. The task model 150 synthesizes the features of the compressed representation 210 and outputs the predicted ML task output 350.

Alternate Embodiment Including Multiple Data Compression Systems

Figure 4A:
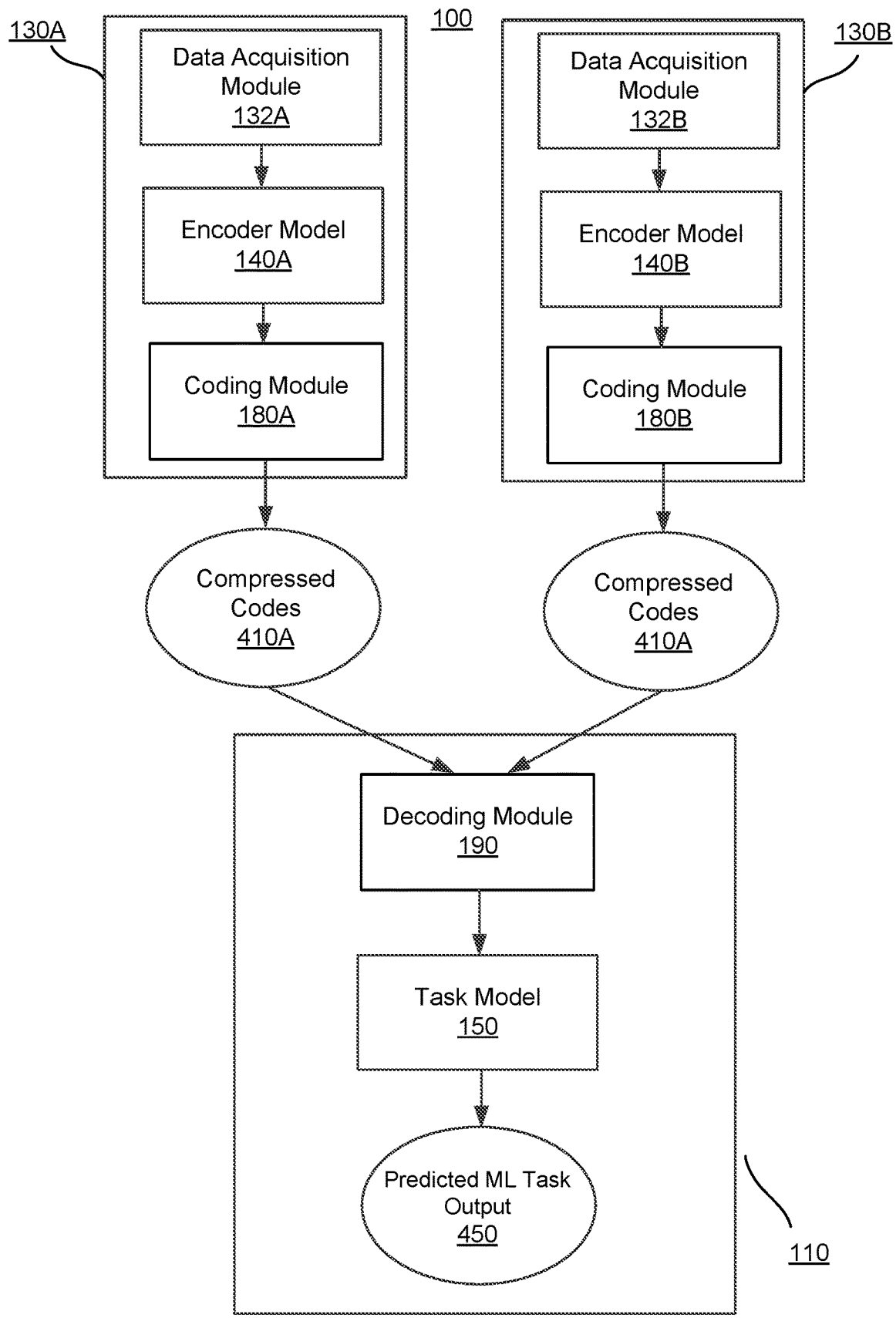
FIG. 4A depicts a system environment with multiple data compression systems that each provide compressed codes to the ML task system, in accordance with an embodiment.

FIG. 4A depicts a system environment 100 with multiple data compression systems 130 that each provide compressed codes 410 to the ML task system 110, in accordance with an embodiment. Although FIG. 4A depicts two data compression system 130, in various embodiments there may be more data compression systems 130 in the system environment 100. Multiple data compression systems 130A and 130B can be beneficial for the performance of a ML task. For example, each of the data compression systems 130A and 130B can be a security camera that captures an individual image. Therefore, each data compression system 130 can intelligently encode a captured image as compressed codes 410 such that the ML task system 110 can perform a ML task, such as a facial recognition ML task, using the combination of compressed codes 410.

In these embodiments, the data acquisition module 132 of each data compression system 130 can acquire data independent of other data compression systems 130. Each data compression system 130A applies the acquired data as input into an encoder model 140A and 140B that is previously trained and provided by the ML task system 110. Each encoder model 140A and 140B outputs a compressed representation that is encoded by the coding module 180. Each coding module 180 outputs a compressed codes 410A and 410B that represents the encoded version of acquired data. Each compressed codes 410A and 410B is transmitted to the ML task system 110.

As shown in FIG. 4A, the compressed codes 410A and 410B are provided to the decoding module 190. The decoding module 190 performs a decoding process to regenerate a compressed representation for each compressed code 410A and 410B. Each compressed representation is provided as input to the task model 150 of the ML task system 110. The task model 150 synthesizes the features across the compressed representations to perform the ML task. The task model 150 outputs the predicted ML task output 450.

Figure 4B:
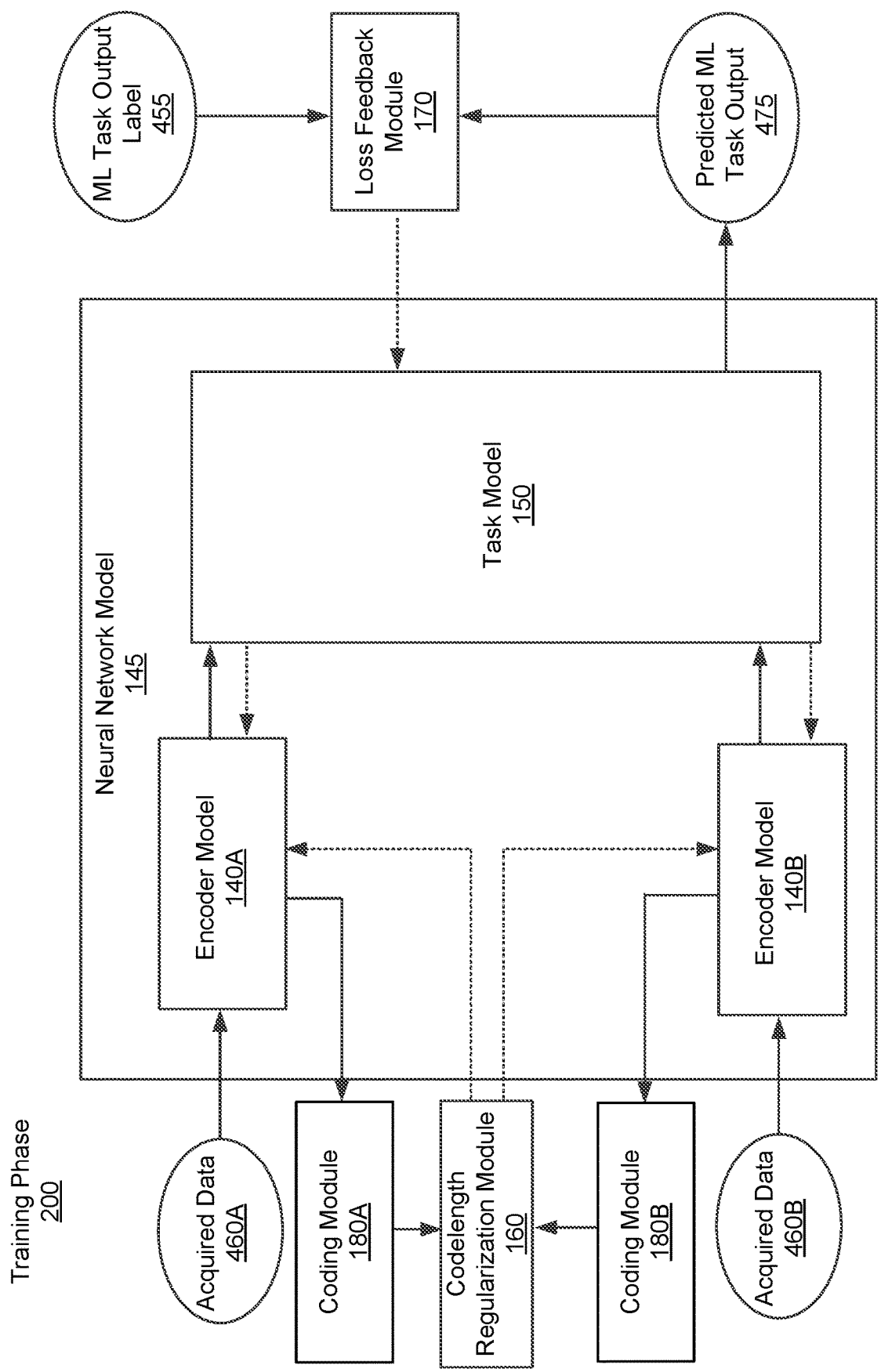
FIG. 4B is a flow diagram of the architecture used to train the neural network model, in accordance with the embodiment shown in FIG. 4A.
Figure 5:
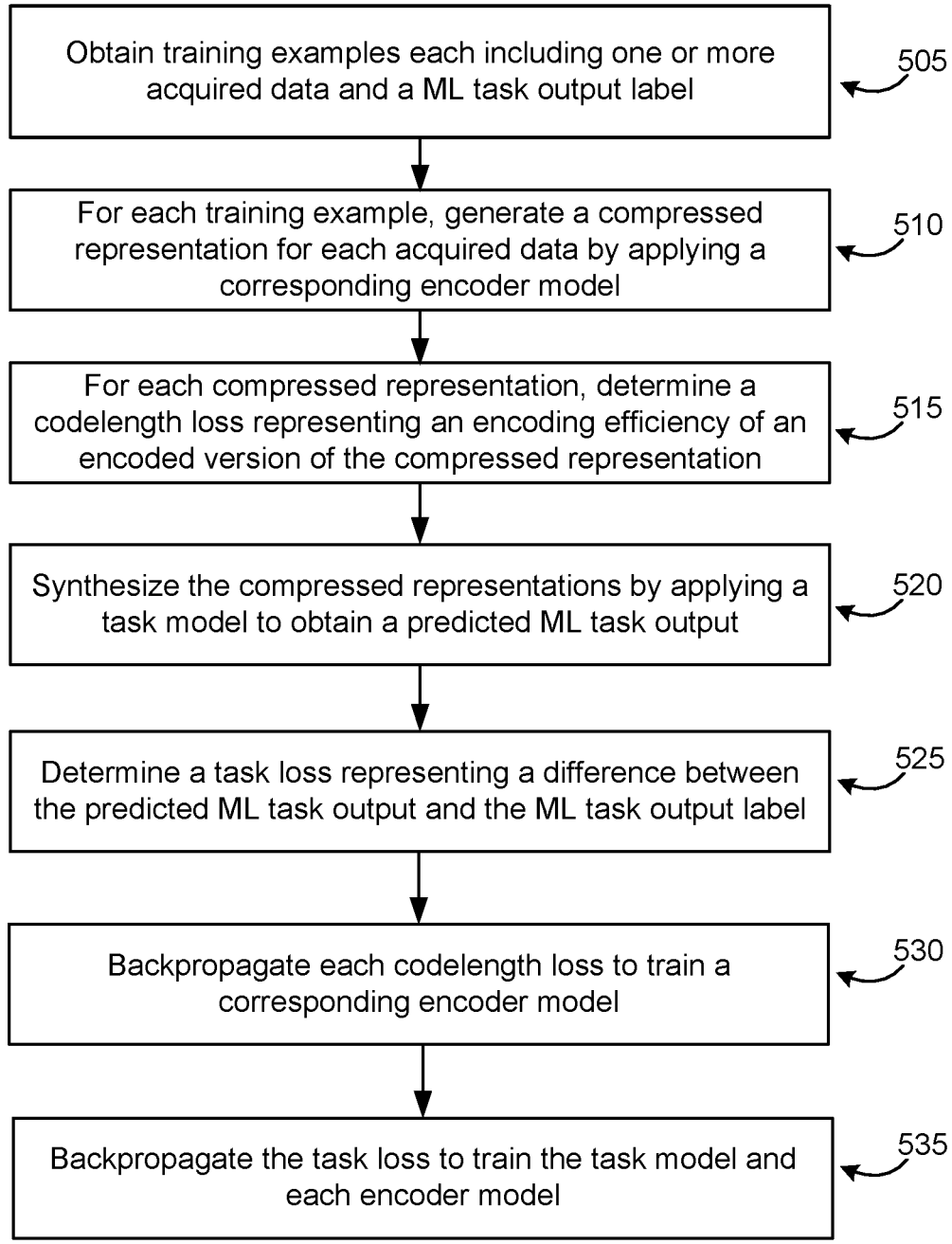
FIG. 5 is a flow process for training the neural network model, in accordance with an embodiment.

FIG. 4B is a flow diagram of the architecture used to train the neural network model 145, in accordance with the embodiment shown in FIG. 4A. Information flow during the forward pass is shown as solid arrows whereas information flow during the backpropagation process is shown as dotted arrows. Further reference will be made to FIG. 5 which is a flow process for training the neural network model 145, in accordance with an embodiment.

The neural network model 145 includes multiple encoder portions (e.g., encoder model 140A and encoder model 140B) and one task model 150. Each encoder model 140A and 140B can be linked to the task model 150. For example, the output layer of nodes of the encoder model 140A serves as a portion of the nodes of the input layer of the task model 150. The output layer of nodes of the encoder model 140B serves as another portion of nodes of the input layer of the task model 150.

In various embodiments, each of the encoder models 140A and 140B is trained for a corresponding data compression system 130A and 130B. For example, encoder model 140A can be trained using acquired data 460A that is acquired by the data acquisition module 132A (see FIG. 4A) whereas encoder model 140B can be trained using acquired data 460B that is acquired by the data acquisition module 132B (see FIG. 4A). Returning to the previous example where each data compression system 130 is a security camera, training each encoder model 140A and 140B for each data compression system 130A and 130B takes into consideration any variations that are specific for each data compression system 130A and 130B (e.g., position/orientation of each security camera, amount of light exposure in each captured image, and the like).

The ML task system 110 obtains 505 training examples that each includes one or more acquired data 460A and 460B and the ML task output label 455. The ML task system 110 trains the neural network model 145 using the training examples. For each training example, the ML task system 110 generates 510 a compressed representation for each acquired data 460A or 460B by applying a corresponding encoder model 140A or 140B. As shown in FIG. 4B, each encoder model 140A and 140B is a portion of the neural network model 145. The output of each encoder model 140A and 140B is a compressed representation of the corresponding acquired data 460A or 460B.

The ML task system 110 determines 515 a codelength loss for each compressed representation. The compressed representation output by each encoder model 140A and 140B is provided to an coding module 180. Each coding module 180 performs an encoding process to generate compressed codes, which are provided to the codelength regularization module 160 for determination of a codelength loss. Each codelength loss represents an encoding efficiency of the corresponding compressed representation.

The ML task system 110 synthesizes 520 the compressed representations generated by encoder models 140A and 140B to obtain a predicted ML task output 475. The ML task system 110 applies each of the compressed representations as input to a task model 150 of the neural network model 145. The ML task system 110 determines 525 a task loss representing a difference between the predicted ML task output 475 and the ML task output label 455 of the training example.

The ML task system 110 backpropagates 530 each codelength loss to train a corresponding encoder model 140A or 140B of the neural network model 145. Additionally, the ML task system 110 backpropagates 535 the task loss to train the task model 150 as well as each of the encoder models 140A and 140B.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining training examples, each training example comprising acquired data and a machine learning task output label;
training a neural network using one or more error terms obtained from a loss function to update a set of parameters of the neural network, where the neural network comprises an encoder portion and a task portion, and where the loss function comprises:
a first loss describing an accuracy of a machine learning task output predicted by the neural network in comparison to the machine learning task output label of a training example of the training examples, and
a second loss describing an encoding efficiency of compressed codes generated from a compressed representation of the acquired data of the training example output by an intermediate layer of the neural network where the encoder portion terminates before the task portion; and
storing the set of parameters of the neural network on a computer readable medium.

2. The method of claim 1, wherein training the neural network comprises:
applying the acquired data of the training example as input to the encoder portion of the neural network to obtain a compressed representation of the acquired data; and
determining the second loss by comparing a codelength of compressed codes generated from the compressed representation to a target codelength.

3. The method of claim 2, wherein the target codelength is set based on an amount of available bandwidth.

4. The method of claim 2, wherein training the neural network further comprises:
applying the compressed representation as input to the task portion of the neural network to obtain a predicted machine learning task output; and
determining the first loss by comparing the machine learning task output to the machine learning task output label of the training example.

5. The method of claim 1, wherein the neural network is trained to maximize the accuracy of the machine learning task output predicted by the neural network while ensuring that the compressed codes generated from the compressed representation does not exceed a threshold codelength that is dependent on available bandwidth.

6. The method of claim 1, wherein the neural network is trained to minimize a codelength of the compressed codes generated from the compressed representation while maintaining the accuracy of the machine learning task output predicted by the neural network at a minimum accuracy threshold.

7. The method of claim 1, wherein the neural network further comprises one or more additional encoder portions, wherein nodes in an output layer of each of the one or more encoder portions serve as nodes in an input layer of the task portion of the neural network.

8. The method of claim 7, wherein for each of the additional encoder portions of the neural network, the additional encoder portion is trained using:
- the first loss describing the accuracy of the machine learning task output, and
- an additional loss describing an encoding efficiency of compressed codes generated from a representation outputted by the additional encoder portion.

9. The method of claim 1, wherein a machine learning task of the machine learning task output predicted by the neural network is one of a classification task, regression task, clustering task, density estimation task, dimensionality reduction task, or multivariate querying task.

10. The method of claim 9, wherein the classification task is one of an object detection or object recognition task.

11. A system comprising:
- a data compression system comprising:
  - a data acquisition module coupled to acquire data;
  - an encoder portion of a neural network coupled to the data acquisition module to encode the acquired data into a compressed representation, wherein the neural network is trained using:
    - a first loss describing an accuracy of a machine learning task output predicted by the neural network in comparison to the machine learning task output label of a training example; and
    - a second loss describing an encoding efficiency of compressed codes generated from the compressed representation of the acquired data output by an intermediate layer of the neural network,
    - wherein the neural network comprises the encoder portion and further comprises a task portion, the encoder portion terminating in the intermediate layer of the neural network; and
  - a coding module coupled to the encoder portion of the neural network to encode the compressed representation into the compressed codes; and
- a machine learning task system comprising:
  - a decoding module coupled to decode the compressed codes to obtain the compressed representation; and
  - the task portion of the neural network coupled to the decoding module to predict a machine learning task output from the compressed representation.

12. The system of claim 11, wherein training the neural network comprises:
- applying the acquired data as input to the encoder portion of the neural network to obtain the compressed representation of the acquired data; and
- determining the second loss by comparing a codelength of compressed codes generated from the compressed representation to a target codelength.

13. The system of claim 12, wherein the target codelength is set based on an amount of available bandwidth.

14. The system of claim 12, wherein training the neural network further comprises:
- applying the compressed representation as input to the task portion of the neural network to obtain a predicted machine learning task output; and
- determining the first loss by comparing the machine learning task output to a machine learning task output label.

15. The system of claim 11, wherein the neural network is trained to maximize the accuracy of the machine learning task output predicted by the neural network while ensuring that the compressed codes generated from the compressed representation does not exceed a threshold codelength that is dependent on available bandwidth.

16. The system of claim 11, wherein the neural network is trained to minimize a codelength of the compressed codes generated from the compressed representation while maintaining the accuracy of the machine learning task output predicted by the neural network at a minimum accuracy threshold.

17. The system of claim 11, further comprising one or more additional data compression systems that each comprise an additional encoder portion of the neural network, wherein nodes in an output layer of each of the one or more encoder portions serve as nodes in an input layer of the task portion of the neural network.

18. The system of claim 17, wherein for each of the additional encoder portions of the neural network, the additional encoder portion is trained using:
- the first loss describing the accuracy of the machine learning task output, and
- an additional loss describing an encoding efficiency of compressed codes generated from a representation outputted by the additional encoder portion.

19. The system of claim 11, wherein a machine learning task of the machine learning task output predicted by the neural network is one of a classification task, regression task, clustering task, density estimation task, dimensionality reduction task, or multivariate querying task.

20. The system of claim 19, wherein the classification task is one of an object detection or object recognition task.

21. An article of manufacture comprising parameters of an encoder portion of a neural network stored on a computer readable storage medium, wherein the encoder portion is produced by a process comprising:
- obtaining training examples, each training example comprising acquired data and a machine learning task output label;
- training the neural network using one or more error terms obtained from a loss function to update a set of parameters of the neural network, the loss function comprising:
  - a first loss describing an accuracy of a machine learning task output predicted by the neural network in comparison to the machine learning task output label of a training example of the training examples; and
  - a second loss describing an encoding efficiency of compressed codes generated from a compressed representation of the acquired data of the training example output by an intermediate layer of the neural network,
  - wherein the neural network comprises the encoder portion and a task portion, the encoder portion terminating in the intermediate layer of the neural network; and
- storing parameters of the encoder portion of the neural network on the computer readable storage medium.

22. The article of manufacture of claim 21, wherein training the parameters of the neural network comprises:
- applying the acquired data of the training example as input to the encoder portion of the neural network to obtain a compressed representation of the acquired data; and
- determining the second loss by comparing a codelength of compressed codes generated from the compressed representation to a target codelength.

23. The article of manufacture of claim 22, wherein the target codelength is set based on an amount of available bandwidth.

24. The article of manufacture of claim 22, wherein training the parameters of the neural network further comprises:
    applying the compressed representation as input to the task portion of the neural network to obtain a predicted machine learning task output; and
    determining the first loss by comparing the machine learning task output to the machine learning task output label of the training example.

25. The article of manufacture of claim 21, wherein the neural network is trained to maximize the accuracy of the machine learning task output predicted by the neural network while ensuring that the compressed codes generated from the compressed representation does not exceed a threshold codelength that is dependent on available bandwidth.

26. The article of manufacture of claim 21, wherein the neural network is trained to minimize a codelength of the compressed codes generated from the compressed representation while maintaining the accuracy of the machine learning task output predicted by the neural network at a minimum accuracy threshold.

27. The article of manufacture of claim 21, wherein the neural network further comprises one or more additional encoder portions, wherein nodes in an output layer of each of the one or more encoder portions serve as nodes in an input layer of the task portion of the neural network.

28. The article of manufacture of claim 27, wherein for each of the additional encoder portions of the neural network, the additional encoder portion is trained using:
    the first loss describing the accuracy of the machine learning task output, and
    an additional loss describing an encoding efficiency of compressed codes generated from a representation outputted by the additional encoder portion.

29. The method of claim 21, wherein a machine learning task of the machine learning task output predicted by the neural network is one of a classification task, regression task, clustering task, density estimation task, dimensionality reduction task, or multivariate querying task.

30. The article of manufacture of claim 29, wherein the classification task is one of an object detection or object recognition task.

31. An article of manufacture comprising parameters of a task portion of a neural network stored on a computer readable storage medium, wherein the task portion is produced by a process comprising:
    obtaining training examples, each training example comprising acquired data and a machine task output label;
    training the neural network using one or more error terms obtained from a loss function to update a set of parameters of the neural network, the loss function comprising:
        a first loss describing an accuracy of a machine learning task output predicted by the neural network in comparison to the machine learning task output label of a training example of the training examples; and
        a second loss describing an encoding efficiency of compressed codes generated from a compressed representation of the acquired data of the training example output by an intermediate layer of the neural network,
    wherein the neural network comprises an encoder portion and the task portion, the encoder portion terminating in the intermediate layer of the neural network; and
    storing parameters of the task portion of the neural network on the computer readable storage medium.

32. The article of manufacture of claim 31, wherein training the parameters of the neural network comprises:
    applying the acquired data of the training example as input to the encoder portion of the neural network to obtain a compressed representation of the acquired data; and
    determining the second loss by comparing a codelength of compressed codes generated from the compressed representation to a target codelength.

33. The article of manufacture of claim 32, wherein the target codelength is set based on an amount of available bandwidth.

34. The article of manufacture of claim 32, wherein training the parameters of the neural network further comprises:
    applying the compressed representation as input to the task portion of the neural network to obtain a predicted machine learning task output; and
    determining the first loss by comparing the machine learning task output to the machine learning task output label of the training example.

35. The article of manufacture of claim 31, wherein the neural network is trained to maximize the accuracy of the machine learning task output predicted by the neural network while ensuring that the compressed codes generated from the compressed representation does not exceed a threshold codelength that is dependent on available bandwidth.

36. The article of manufacture of claim 31, wherein the neural network is trained to minimize a codelength of the compressed codes generated from the compressed representation while maintaining the accuracy of the machine learning task output predicted by the neural network at a minimum accuracy threshold.

37. The article of manufacture of claim 31, wherein the neural network further comprises one or more additional encoder portions, wherein nodes in an output layer of each of the one or more encoder portions serve as nodes in an input layer of the task portion of the neural network.

38. The article of manufacture of claim 37, wherein for each of the additional encoder portions of the neural network, the additional encoder portion is trained using:
    the first loss describing the accuracy of the machine learning task output, and
    an additional loss describing an encoding efficiency of compressed codes generated from a representation outputted by the additional encoder portion.

39. The method of claim 31, wherein a machine learning task of the machine learning task output predicted by the neural network is one of a classification task, regression task, clustering task, density estimation task, dimensionality reduction task, or multivariate querying task.

40. The article of manufacture of claim 39, wherein the classification task is one of an object detection or object recognition task.

* * * * *